United States Patent
Agarwal et al.

(10) Patent No.: US 10,318,803 B1
(45) Date of Patent: Jun. 11, 2019

(54) TEXT LINE SEGMENTATION METHOD

(71) Applicant: KONICA MINOLTA LABORATORY U.S.A., INC., San Mateo, CA (US)

(72) Inventors: Shubham Agarwal, Belmont, CA (US); Yongmian Zhang, Union City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 63 days.

(21) Appl. No.: 15/828,110

(22) Filed: Nov. 30, 2017

(51) Int. Cl.
*G06K 9/00* (2006.01)
*G06K 9/62* (2006.01)
*G06T 11/20* (2006.01)
*G06K 9/46* (2006.01)

(52) U.S. Cl.
CPC ....... *G06K 9/00463* (2013.01); *G06K 9/4633* (2013.01); *G06K 9/6223* (2013.01); *G06T 11/20* (2013.01); *G06T 2210/12* (2013.01)

(58) Field of Classification Search
USPC ........ 382/100, 137, 173, 176, 187, 295, 296
See application file for complete search history.

(56) References Cited

U.S. PATENT DOCUMENTS

| | | | | |
|---|---|---|---|---|
| 5,513,304 A | * | 4/1996 | Spitz | G06K 9/348 382/295 |
| 5,588,072 A | * | 12/1996 | Wang | G06K 9/00442 382/176 |
| 5,953,451 A | * | 9/1999 | Syeda-Mahmood | G06F 16/5854 382/187 |
| 7,130,445 B2 | * | 10/2006 | Ruhl | G06F 21/64 382/100 |
| 8,606,011 B1 | * | 12/2013 | Ivanchenko | G06K 9/3258 382/176 |
| 8,965,127 B2 | * | 2/2015 | Wu | G06K 9/348 382/173 |
| 9,235,755 B2 | * | 1/2016 | Wu | G06K 9/00449 |
| 9,430,703 B2 | * | 8/2016 | Ming | G06K 9/00463 |
| 9,852,348 B2 | * | 12/2017 | Chaudhury | G06K 9/00463 |

(Continued)

OTHER PUBLICATIONS

Louloudis, G., et al., "Text line detection in handwritten documents", Pattern Recognition 41, No. 12 (2008) 3758-3772.*

(Continued)

*Primary Examiner* — Xuemei G Chen
(74) *Attorney, Agent, or Firm* — Chen Yoshimura LLP

(57) ABSTRACT

In a text line segmentation process, connected components (CCs) in document image are categorized into three subsets (normal, large, small) based on their sizes. The centroids of the normal size CCs are used to perform line detection using Hough transform. Among the detected candidate lines, those with line bounding box heights greater than a certain height are removed. For each normal size CC, if its bounding box does not overlap the bounting box of any line with an overlap area greater than a predefined fraction of the CC bounding box, a new line is added for this CC, which passes through the centroid of the CC and has an average slant angle. Each large size CCs are broken into two or more CCs. All CCs are then assigned to the nearest lines. A refinement method is also described, which can take any text line segmentation result and refine it.

20 Claims, 9 Drawing Sheets

(56) References Cited

U.S. PATENT DOCUMENTS

| | | | |
|---|---|---|---|
| 10,127,673 B1* | 11/2018 | Ben Khalifa | G06T 7/11 |
| 2002/0037097 A1* | 3/2002 | Hoyos | G06K 9/00449 382/137 |
| 2011/0007970 A1* | 1/2011 | Saund | G06K 9/00449 382/176 |
| 2011/0052094 A1* | 3/2011 | Gao | G06K 9/3283 382/296 |
| 2015/0063699 A1 | 3/2015 | Wu | |
| 2017/0091948 A1* | 3/2017 | Paradkar | G06K 9/4604 |

OTHER PUBLICATIONS

Louloudis et al., "Text line and word segmentation of handwritten documents", Pattern Recognition 42, No. 12 (2009): 3169-3183.

Vinciarelli et al., "A new normalization technique for cursive handwritten words", Pattern recognition letters, 22(9), 1043-1050 (2001).

Du et al., "Text line segmentation in handwritten documents using Mumford-Shah model", Pattern Recognition, 42 (12), 3136-3145 (2009).

* cited by examiner

Core Region (a)

can grow significantly over the long-term,
which is a unique opportunity for those under 40.
Kristin McFarland, CFP® is a Wealth Advisor from
Darrow Wealth Management, a registered advisor (b)

can grow significantly over the long-term,
which is a unique opportunity for those under 40.
Kristin McFarland, CFP® is a Wealth Advisor from
Darrow Wealth Management, a registered advisor (c)

can grow significantly over the long-term,
which is a unique opportunity for those under 40.
Kristin McFarland, CFP® is a Wealth Advisor from
Darrow Wealth Management, a registered advisor

Fig. 8A (g)

can grow significantly over the long-term, which is a unique opportunity for those under 40. Kristin McFarland, CFP® is a Wealth Advisor from Darrow Wealth Management, a registered advisor (h) 82 can grow significantly over the long-term, which is a unique opportunity for those under 40. Kristin McFarland, CFP® is a Wealth Advisor from Darrow Wealth Management, a registered advisor (i)

can grow significantly over the long-term, which is a unique opportunity for those under 40. Kristin McFarland, CFP® is a Wealth Advisor from Darrow Wealth Management, a registered advisor

Fig. 8C

TEXT LINE SEGMENTATION METHOD

BACKGROUND OF THE INVENTION

Field of the Invention

This invention relates to document image processing, and in particular, it relates to a method for text line segmentation for document images.

Description of Related Art

Text line segmentation, i.e., segmenting lines of text from a document image (e.g. handwritten documents), is an important part of an intelligent character/word recognition (ICR/IWR) system. Many methods have been described, but it is difficult to obtain a general algorithm that can work well on a variety of writing samples having different slope, slant, inter-line connections, etc.

In the field of offline intelligent word/character recognition, a conventional ICR/IWR system typically includes the following stages for processing an input text document image: text line segmentation; word/character segmentation; and a recognition module (usually CNN of kNN), to generate output word or character. Robust text line and word segmentation is a major bottleneck. Errors in text line segmentation lead to distorted input to the word/character recognition module and hence wrong output. With the introduction of multi-dimensional Recurrent Neural Networks, some proposals try to by-pass the line segmentation stage. In other words, the input text document image is fed directly into a multi-dimensional RNN, which outputs the recognized text. The RNN approach gives better recognition accuracy but suffers from very high computational cost and is currently difficult to deploy on a real time offline ICR/IWR system.

G. Louloudis, B. Gatos, I. Pratikakis, and C. Halatsis, Text line and word segmentation of handwritten documents, Pattern Recognition 42, no. 12 (2009): 3169-3183 (hereinafter "Louloudis 2009"), describes "a segmentation methodology of handwritten documents in their distinct entities, namely, text lines and words. Text line segmentation is achieved by applying Hough transform on a subset of the document image connected components. A post-processing step includes the correction of possible false alarms, the detection of text lines that Hough transform failed to create and finally the efficient separation of vertically connected characters using a novel method based on skeletonization."

A. Vinciarelli and J. Luettin, A new normalization technique for cursive handwritten words, Pattern recognition letters, 22(9), 1043-1050 (2001) describes a method for normalizing cursive handwritten words. It uses the core region concept to identify the baseline of a word and use it for normalization.

SUMMARY

The present invention is directed to an improved text line segmentation method for a ICR/IWR system, which uses a novel method for average character height estimation and a more robust way of identifying text lines.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a text line segmentation method performed on a binary document image, which includes: (a) detecting connected components in the document image, and computing centroids and bounding boxes of the connected components; (b) categorizing the connected components into three subsets based on their bounding box sizes, including a first subset of normal size connected components, a second subset of large size connected components, and a third subset of small size connected components; (c) detecting a plurality of candidate lines from the first subset of connected components by applying Hough transform to the centroids of the first subset of connected components; (d) removing candidate lines that has a line bounding box height greater than a predefined multiplier times an average line bounding box height of all candidate lines, wherein remaining candidate lines constitute legitimate lines; (e) for each connected component of the first subset, computing an overlap area between the connected component and each legitimate line, and if a maximum one among the overlap areas is no greater than a predefined fraction of a bounding box area of the connected component, adding a new line as a legitimate line, wherein the new line passes through the centroid of the connected component and has an angle equal to an average angle of all candidate lines; (f) breaking each of the second subset of connected components into two or more connected components; and (g) assigning each connected component of the first subset, each connected component of the third subset, and each connected component obtained by breaking the connected components of the second subset in step (f), to a nearest one of the legitimate lines obtained in step (e), to generate segmented text lines.

In some embodiments, step (c) includes: (c1) applying Hough transform to the centroids of the first subset of connected components to generate an accumulator array having a plurality of cells; (c2) identifying a cell of the accumulator array that has a maximum value among the cells, and if its value is greater than a predefined threshold, adding a line corresponding to the identified cell to a list of candidate lines and removing connected components belonging to the candidate line from the first subset of connected components; and repeating steps (c1) and (c2) until the value of the cell having a maximum value is no greater than the first predefined threshold.

In some embodiments, step (d) includes: for each candidate line detected in step (c), computing a line bounding box that bounds all connected components of the first subset that belong to the candidate line; computing an average line bounding box height of the line bounding boxes of all candidate lines; removing any candidate line that has a line bounding box height greater than the predefined multiplier times the average line bounding box height.

In some embodiments, in step (b) the connected components are categorized into three subsets based on their bounding box sizes and an average connected component height.

In some embodiments, the method further includes: (h) using the segmented text lines generated in step (g), computing an average height of text lines; (i) categorizing the connected components detected in step (a) into three subsets based on their bounding box sizes and the average height of text lines computed in step (h), including a first subset of normal size connected components, a second subset of large size connected components, and a third subset of small size connected components; and repeating steps (c), (d), (e), (f) and (g) using the three subsets of connected components obtained in step (i).

In some embodiment, step (h) includes: for each segmented text line generated in step (g): computing a pixel density histogram representing a pixel density for each row of the text line; applying a k-means clustering computation with k=2 to the pixel density histogram to classify histogram elements into two classes corresponding to high and low density rows; and computing a width of a widest high density region as height of the text line; and computing an average of the heights of all text lines as the average height of text lines.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 8A-8C show text samples and their treatment for text line segmentation.

DETAILED DESCRIPTION OF PREFERRED EMBODIMENTS

Figure 1:
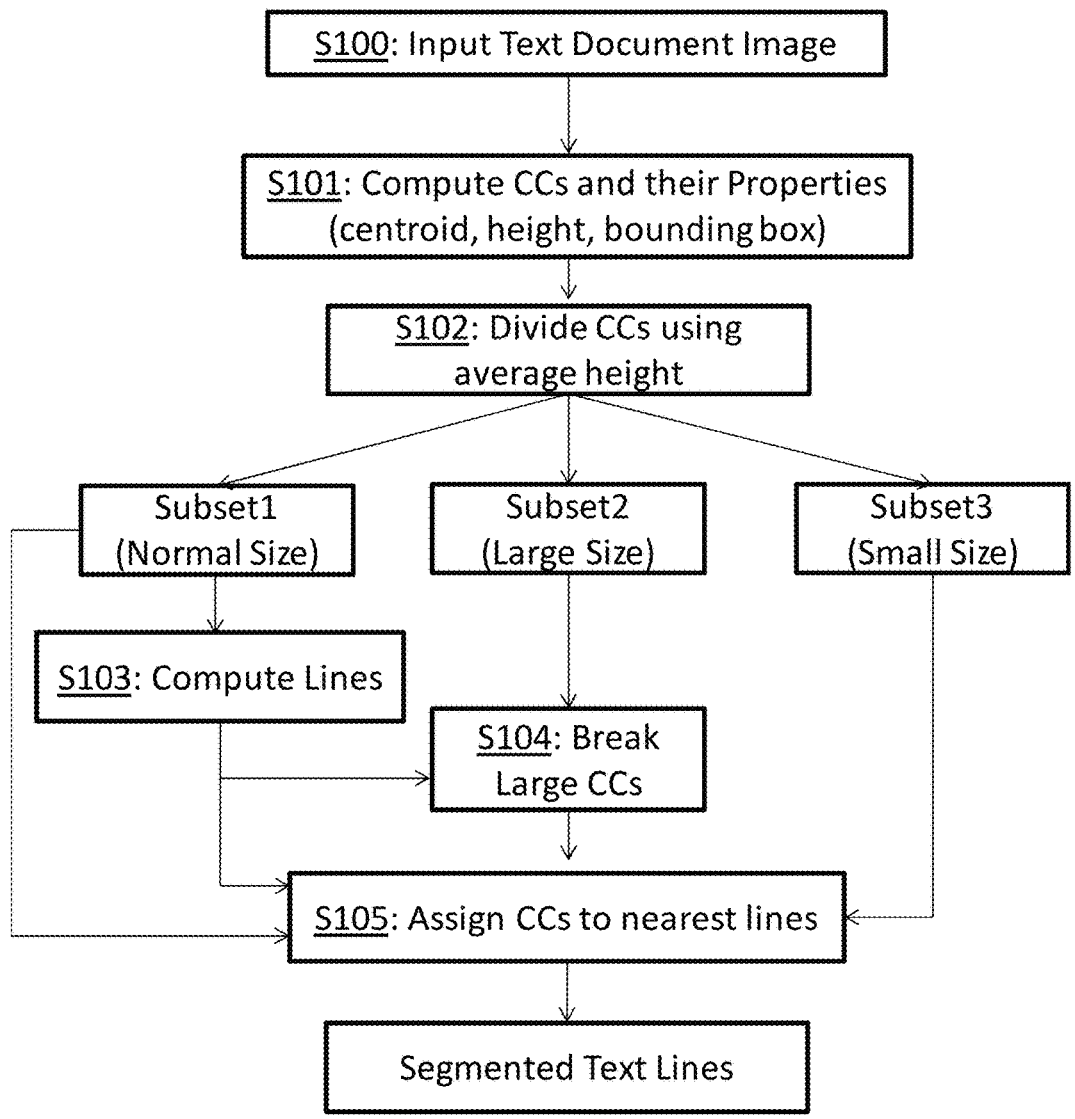
FIG. 1 schematically illustrates a conventional line segmentation method.

FIG. 1 schematically illustrates a conventional line segmentation method for handwritten documents, as described in Louloudis 2009. The method starts with an input text document image (S100), which is a binary image including foreground pixels (i.e. black pixels) representing text content and background pixels (e.g. white pixels). A connected component analysis is applied to the input image to extract connected components (step S101). A connected component (CC) is a group of connected foreground pixels. The properties of the CCs, such as their centroids, bounding boxes (a CC bounding box is a rectangular box with horizontal and vertical sides that bounds a CC), and heights are computed in this step. Then, the CCs are divided into three subsets based on their sizes, using an average height of the CCs as the average character height to set the criteria for division (step S102). The three subsets are referred to as a first subset for normal size, a second subset for large size, and a third subset for small size. In one example, the dividing lines for the three subsets are set at a first predefined threshold size s1 (e.g. 0.5) times the average CC height and a second threshold predefined size s2 (e.g. 3) times the average CC height. More specifically, in this example, a CC is categorized as a normal size CC if $$s1*AH \leq H < s2*AH \text{ and } s3*AW \leq W$$

where H and W are the CC height and width, AH is the average character height calculate above, and AW is the average character width which in this example is set to be as the same as the calculated AH. s3 is a third predefined threshold size (e.g. 0.5). A CC is categorized as a large size CC if $$H \geq s2*AH$$

or categorized as a small size CC if it does not satisfy the above conditions.

As a general matter, the normal size CCs contain one or more text characters; the small CCs are punctuation marks, diacritical marks, small characters such as "i", etc.; the large size CCs are generally caused by characters from multiple lines touching each other and becoming one CC. FIG. 8A shows a sample text image; panels (a), (b) and (c) respectively show bounding boxes 81, 82 and 83 of normal size, large size, and small size CCs.

The subset of normal size CCs are used for line detection by applying Hough transform to the centroids of the CCs (step S103).

Hough transform is a mathematical technique which can be used to find straight lines from a set of points. It uses straight lines in a Hesse normal form, $$\rho = x \cos \theta + y \sin \theta$$

where ρ is the perpendicular distance from the origin to the line, and θ is the angle between the perpendicular direction of the line and the positive x-axis. In Hough transform, a line is represented in the polar coordinates as (ρ, θ). For a given point in the x-y plane, each straight line that passes through that point gives a point in the (ρ, θ) space; all straight lines that passes through that point give a curve in the (ρ, θ) space. For a set of points in the x-y plane, an accumulator array in the (ρ, θ) space can be constructed, where the value in each cell of the accumulator array represents the number of points lying on the straight line that corresponds to the (ρ, θ) values of the cell. The accumulator array in the (ρ, θ) space is the Hough transform. By applying Hough transform to a set of points (e.g. the centroids of the CCs), cells of the accumulator array that have high values represent likely lines formed by the points.

Figure 8B:
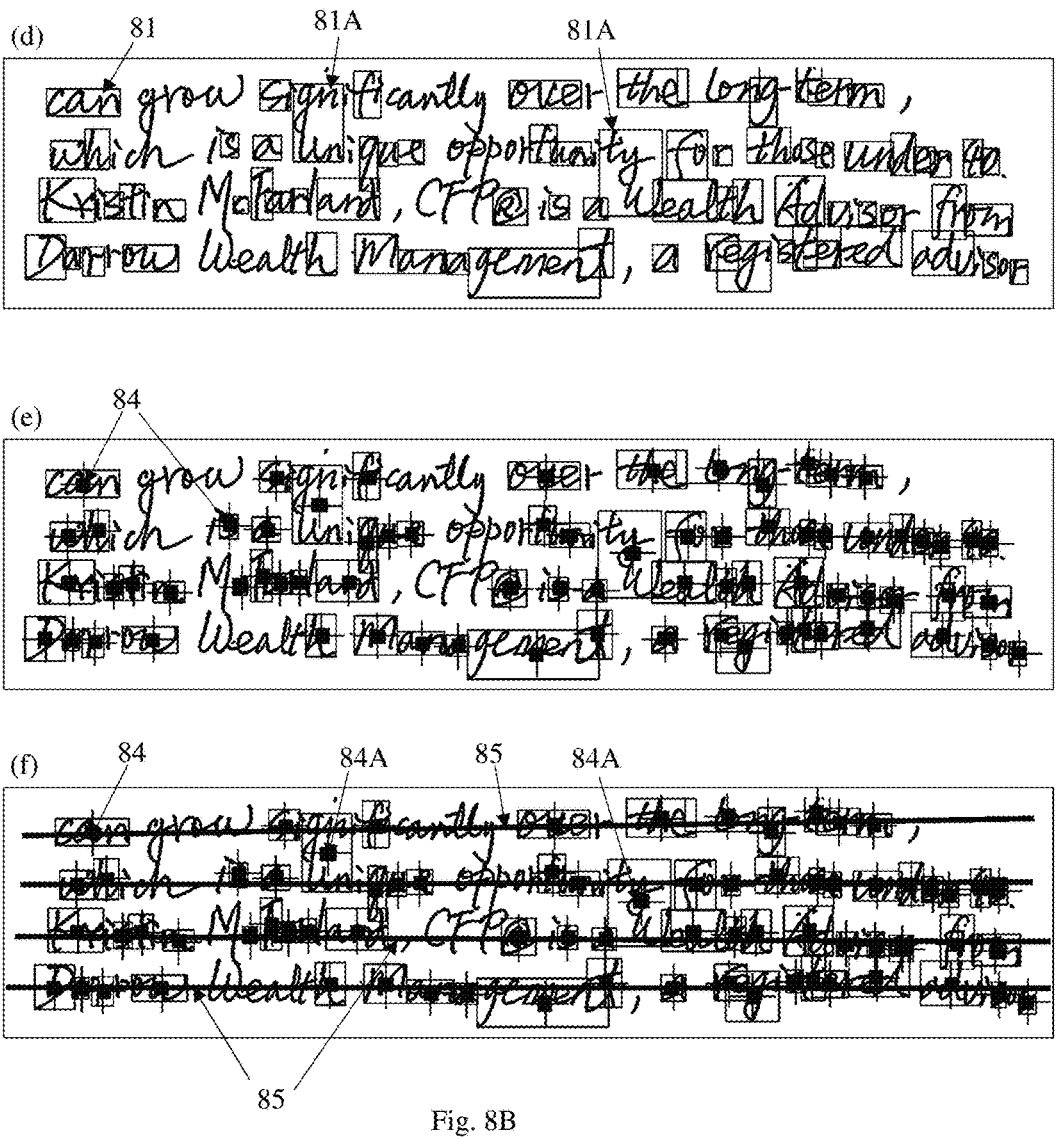

Using the sample text image of FIG. 8A, FIG. 8B shows bounding boxes 81 of normal size CCs (panel (d)), centroids 84 of normal size CCs (panel (e)), and lines 85 detected by Hough transform (panel (f)).

After text line detection, the subset of large size CCs are broken into smaller CCs (step S104). In one example, this is done by applying thinning on these CCs first and then removing the junction points between the lines. In the case that there is no junction points found, the mid-point of two lines is assumed to be the junction point. Then each CC, including each of the normal size CCs, small size CCs, and the CCs resulting from breaking down large size CCs, is assigned to the nearest text line detected in step S103 (step S105) to generate the segmented text lines as output.

The line segmentation method shown in FIG. 1 is highly robust to most handwriting variations. It is based on assumption that the average height of the CCs is very close to the average character height in the text document. However, this assumption often fails in cases where the document image has many inter-line connections which can cause the average height of the CCs to become too high. In the sample text shown in FIGS. 8A and 8B, for example, two CCs 81A were categorized as normal size CCs by the conventional method (panel (a) and panel (d)); in panel (f), it can be seen that their centroids 84A lie far away from the detected lines 85.

To address this issue, embodiments of the present invention provides a method to identify new lines using the average line height and bounding box overlap. Embodiments of the present invention also provide a method for approximating the average character height using core regions of text, used as a refinement stage added to the method described in Louloudis 2009.

Figure 2:
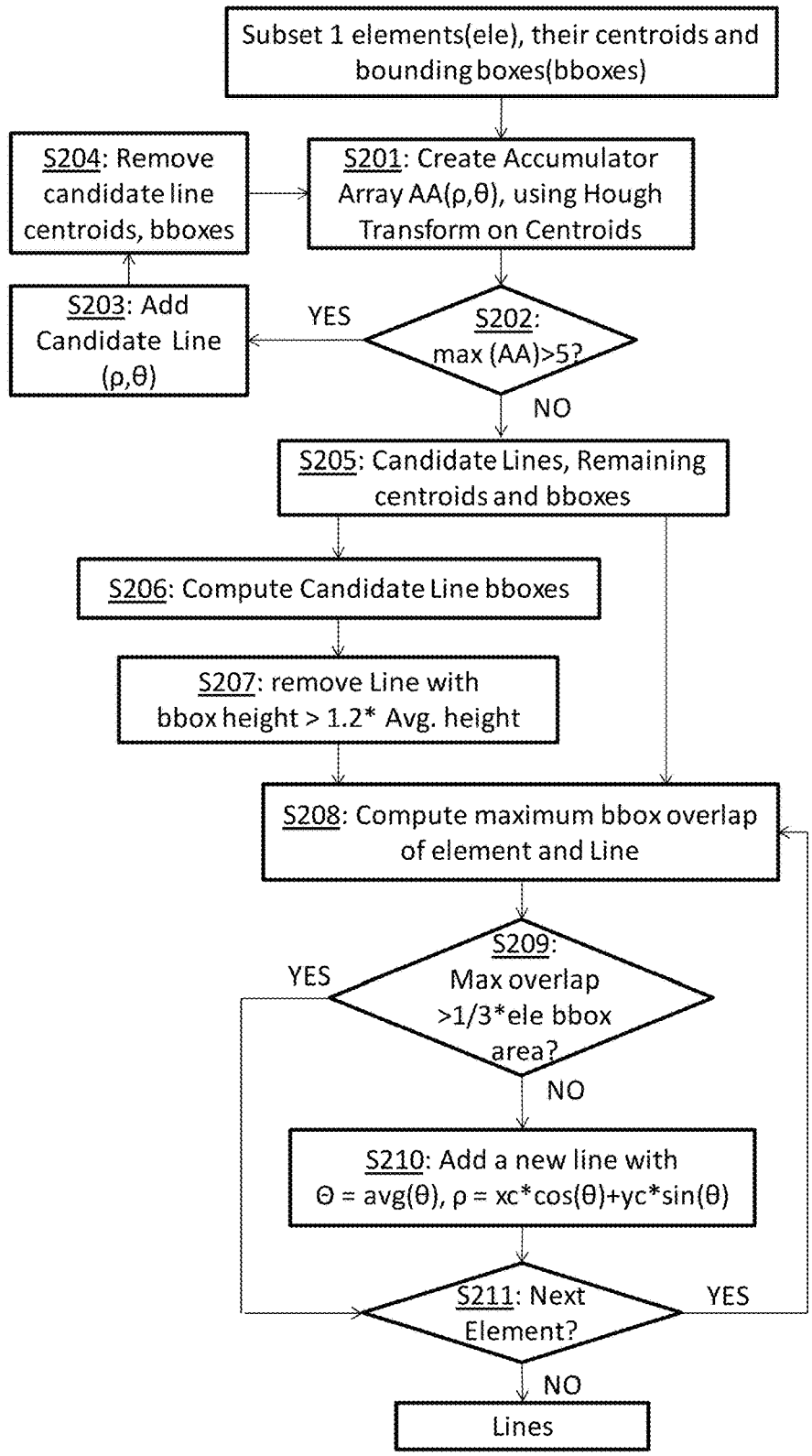
FIG. 2 schematically illustrates a text line detection method according to an embodiment of the present invention.

FIG. 2 schematically illustrates a text line detection method according to an embodiment of the present invention. This method can be used to replace the "Compute Lines" module S103 of the method of FIG. 1. The input to the method of FIG. 2 is the subset of normal sized CCs generated by step S102 of FIG. 1. The centroids, bounding boxes and heights of the CCs have been computed in step S101.

Referring to FIG. 2, in step S201, a Hough transform of the centroids of the CCs is computed. In some implementations, the resolution of $\rho$ for the Hough transform is set to 0.2 times an average height of CCs. The Hough transform gives the weights for each $(\rho, \theta)$ cell of the accumulator array. The centroids that contribute to $(\rho, \theta)$ cells with higher weights have higher probabilities of being in lines. Since a document image is a special case (as compared to a general bitmap image) where text is written, in most cases, in near horizontal lines with relatively small degrees of skew or slant, additional restrictions may be placed on the value of $\theta$ of the $(\rho, \theta)$ cells that are deemed to represent text lines. In one implementation, in step S201, $\theta$ is restricted to the range of 85-95 degrees. Similarly, other information may be used as conditions to restrict the line detection, for example, the assumption that the writer is unlikely to create a crossing of two different text lines.

In step S202, the $(\rho, \theta)$ cell having the maximum value among all cells is examined to determine whether its value is greater than a predefined threshold, for example, 5. If it is greater than the threshold ("yes" in step S202), the $(\rho, \theta)$ cell is considered a candidate line and added to a list of candidate lines (step S203), and all centroids belonging to that line are removed from the list of centroids (step S204). The process then goes back to step S201, where a Hough transform is calculated again but only using the remaining centroids.

Thus, each repetition of steps S201 to S204 extracts one line and corresponding centroids from the original list of centroids.

When in step S202 the $(\rho, \theta)$ cell having the maximum value does not have a value grater than the threshold ("no" in step S202), then all lines are deemed to have been extracted. The result is a list of candidate lines and a list of remaining CCs (with their centroids and bounding boxes) (step S205).

For each candidate line, a line bounding box which bounds all CCs belonging to that line is obtained, and the height of the line bounding box is computed (step S206). An average height of the line bounding boxes of all candidate lines and an average slant angle $\theta$ of all candidate lines are computed (step S206).

Then, all candidate lines that have a line bounding box height greater than a predefined multiplier (e.g., 1.2) times the average line bounding box height, are deemed illegitimate lines and are removed from the list of candidate lines (step S207). The remaining lines are deemed legitimate lines.

Next, for each centroid that does not belong to any legitimate line (this includes centroids that are not a part of any candidate lines as a result of step S205, as well as centroids belongining to legitimate lines which are removed from the line list in step S207), the corresponding CC and its bounding box are obtained, and an overlap between the CC bounding box and each of the legitmate lines is computed (step S208). If the CC bounding box does not have an overlap with any of the legitmate lines that is greater than a predefined fraction (e.g., one-third) of the CC bounding box area ("no" in step S209), a new line is added. The new line has the following parameters (step S210):

$\theta$=average slant angle of all candidate lines, and $\rho$=cx*cos $\theta$+cy*sin $\theta$ where cx and cy are respectively the x and y coordinates of the centroid of the CC. In other words, the new line is one that passes through the centroid of the CC and has an average slant angle.

In step S209, if the CC bounding box has overlaps with at least one of the legitmate lines that is greater than the predefined fraction (e.g. one-third) of the CC bounding box area ("yes" in step S209), no action is taken.

Steps S209 and S210 are repeated for each centroid that do not belong to any legitimate line, until all such centroids are processed ("no" in step S211). This concludes the text line detection step, and the detected text lines are output.

As mentioned earlier, the algorithm described in Louloudis 2009 works well for most real-world scenarios. It is based on division of CCs into three categories according to average CC height. However, the method often fails if the lines have a large number of inter-connections which lead to a high value for average CC height and hence incorrect sub-division. This leads to some of the line inter-connections being classified into normal size CC category and hence they are not broken down and assigned to one of the line. The sample text image in FIGS. 8A and 8B show two examples 81A.

Figure 3:
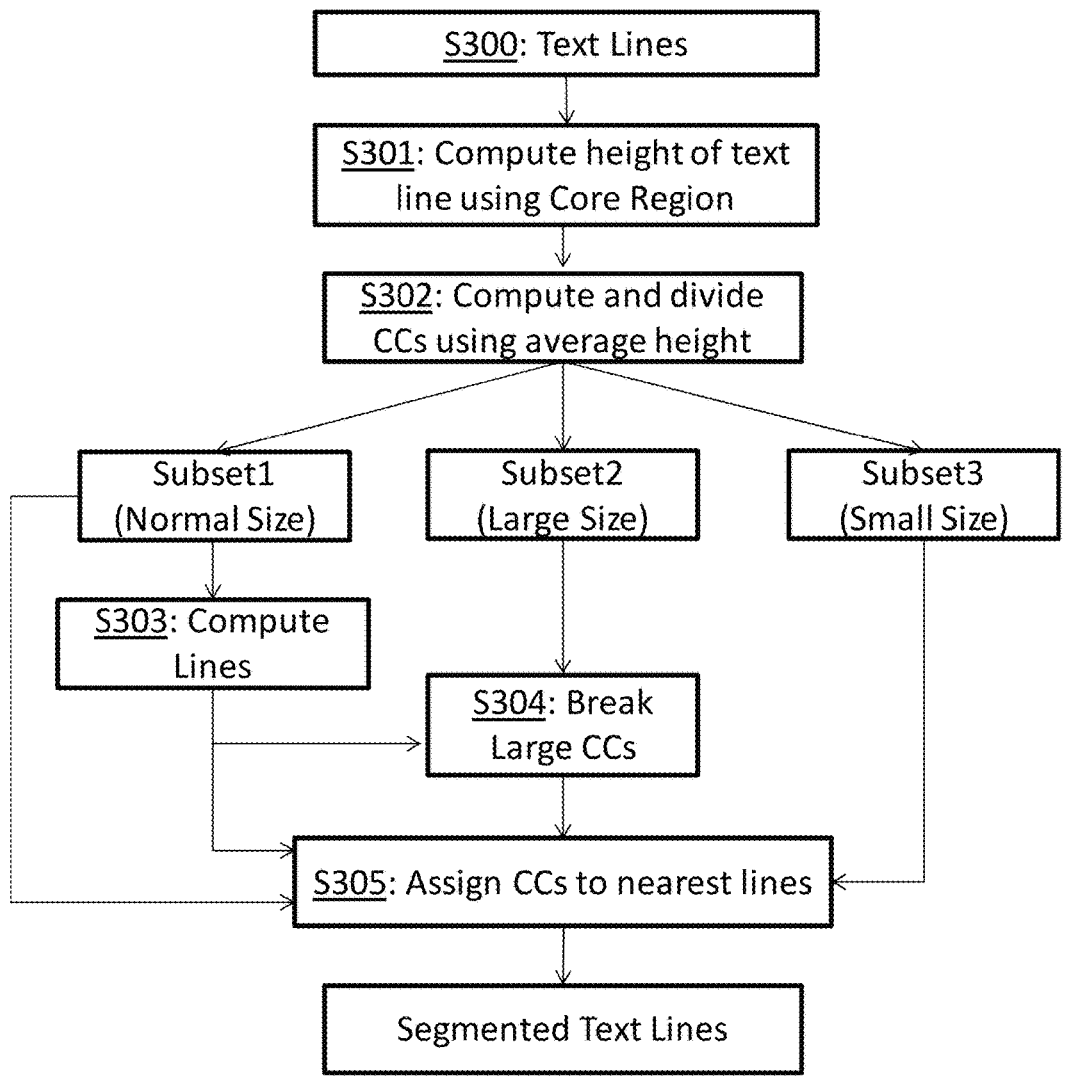
FIG. 3 schematically illustrates a text line segmentation method according to another embodiment of the present invention.
Figure 4:
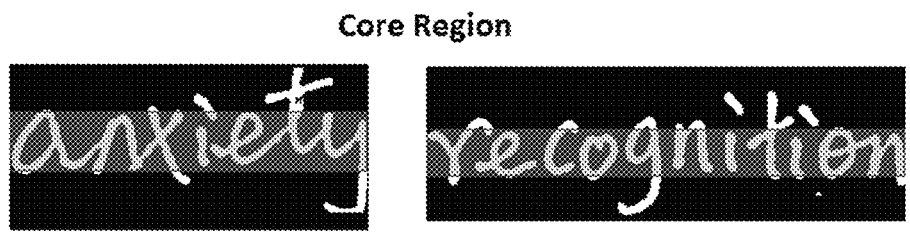
FIG. 4 shows examples of core region estimation for handwritten words.

A line segmentation method according to another embodiment of the present invention, shown in FIG. 3, provides a refinement module to help solve this problem. The refinement module uses the core region of text lines to determine line height. The core region of Roman characters is the center region of the characters; all character includes a core region; some characters include only the core region, and some others also include parts above and/or below the core region. FIG. 4 gives examples of core region approximation. The concept of core region is widely used in text document segmentation for word normalization where the base of the word is computed using the core region and used to estimate text slope and slant.

The refinement module of FIG. 3 takes as input a set of text line images obtained using the conventional line segmentation method shown in FIG. 1 (step S300), and outputs a new set of text lines that represent a more accurate text line segmentation. Due to the problem discussed above, the input text lines may have some large multi-line CCs assigned to a single line. Since most of the text lines are correctly segmented, the input text lines can be used to extract core text region. As discussed above, the core region represents the major portions of Roman characters and ignores the outliers for long characters, and can provide a good approximation for the average character height. Step S301, which will be described in more detail later, uses the core region approach to calculate the average heights of text lines.

Step S302 of the method of FIG. 3 is similar to steps S101 and S102 of the conventional method of FIG. 1 in that it computes the CCs in the input image, and divides the CCs into three subsets using the average character height. But rather than the average character height calculated using the CCs (as in step S102), step S302 uses the average text line height calculated in step S301 to set the criteria for dividing the CCs into subsets. In other words, in the equations of step S102, AH is now replaced by the average text line height AH' and AW is replaced by AW' which equals AH'. Step S303, compute lines, can be performed using the method of FIG. 2. Steps S304 (break large CCs) and S305 (assign CCs to nearest lines) are similar to steps S104 and S105 of FIG. 1.

Figure 6:
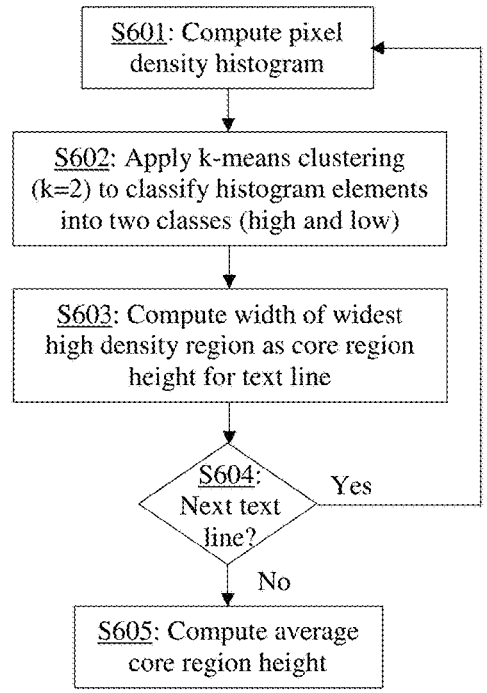
FIG. 6 schematically illustrates a method of estimating a text line height according to an embodiment of the present invention.

Step S301, which computes height of text lines using core regions, is described in detail with reference to FIG. 6.

Figure 5A:
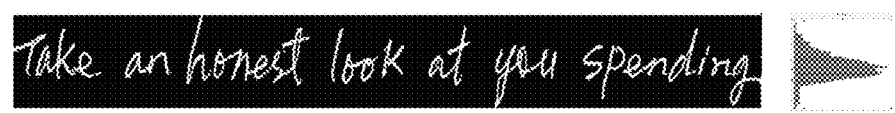
FIG. 5A shows an exemplary text line image and a corresponding pixel density histogram.

For each text line image inputted to step S301, a pixel density histogram is generated by computing the number of foreground pixels in each row of the image (step S601). For a text line image with a relatively low slant angle as in typical handwritings, the histogram is approximately a Gaussian distribution where the line center has a high pixel density compated to the upper and lower ends of the line. FIG. 5A shows an exemplary line image and the corresponding pixel density histogram on the right. In this histogram representation, the vertical axis is the row index of the pixel location and the horizontal axis is the number or density of foreground pixels in the row.

Figure 5B:
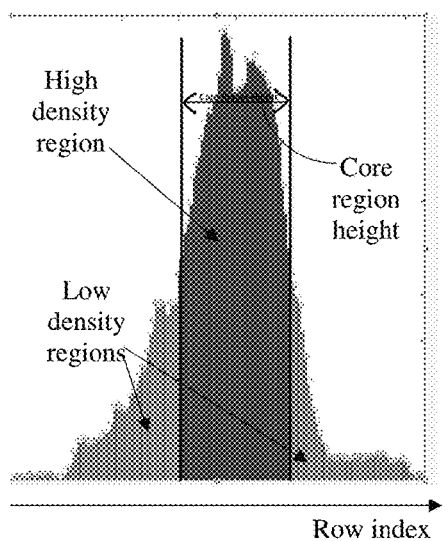
FIG. 5B shows the result of k-means clustering with k=2 on the pixel density histogram of the example of FIG. 5A.

After generating the histogram, a k-means clustering computation is applied to the histogram values to classify the histogram elements into two classes corresponding to high and low density rows (step S602). FIG. 5B shows the result of k-means clustering with k=2 on pixel density data in the example of FIG. 5A. In normal situations where the row indices of the high density rows are in a single contiguous region of the histogram, the width of the high density region is taken as the height of the core region (step S603). This situation is illustrated in FIG. 5B.

In situations where the high density rows appear in two or more contiguous regions of the histogram, which may occur when the input text line image includes text from more than one actual text line, the width of each high density regions is computed, and the largest width is taken as the height of the core region (step S603).

Steps S601 to S603 are repeated to compute the core region height for all input text line images (step S604). The average of the core region heights of all input text lines is then calculated (step S605) and used as the average character height in step S302 of FIG. 3 to divide the CCs into normal, large and small size subsets.

FIG. 8C shows the result of dividing CCs into three subsets using the method of FIG. 3 as a result of step S302, using the same sample text image in FIG. 8A. Panels (g), (h) and (i) respectively show bounding boxes of normal size, large size, and small size CCs obtained by step S302. Compared to panels (a) and (b) of FIG. 8A, it can be seen that two CCs that were erroneously categorized as normal size CCs by the conventional method (panel (a)) are now categorized as large size CCs 82 (panel (h)). Thus, these large size CCs can be properly broken down in step S304 and correctly assigned to text lines in step S305.

The refinement module, i.e. the method of FIG. 3, can be applied to any line segmentation algorithm to improve its accuracy. In other words, after one pass of text line segmentation using a certain segmentation method, the method of FIG. 3 can be applied to generate a refined result of line segmentation.

Figure 7:
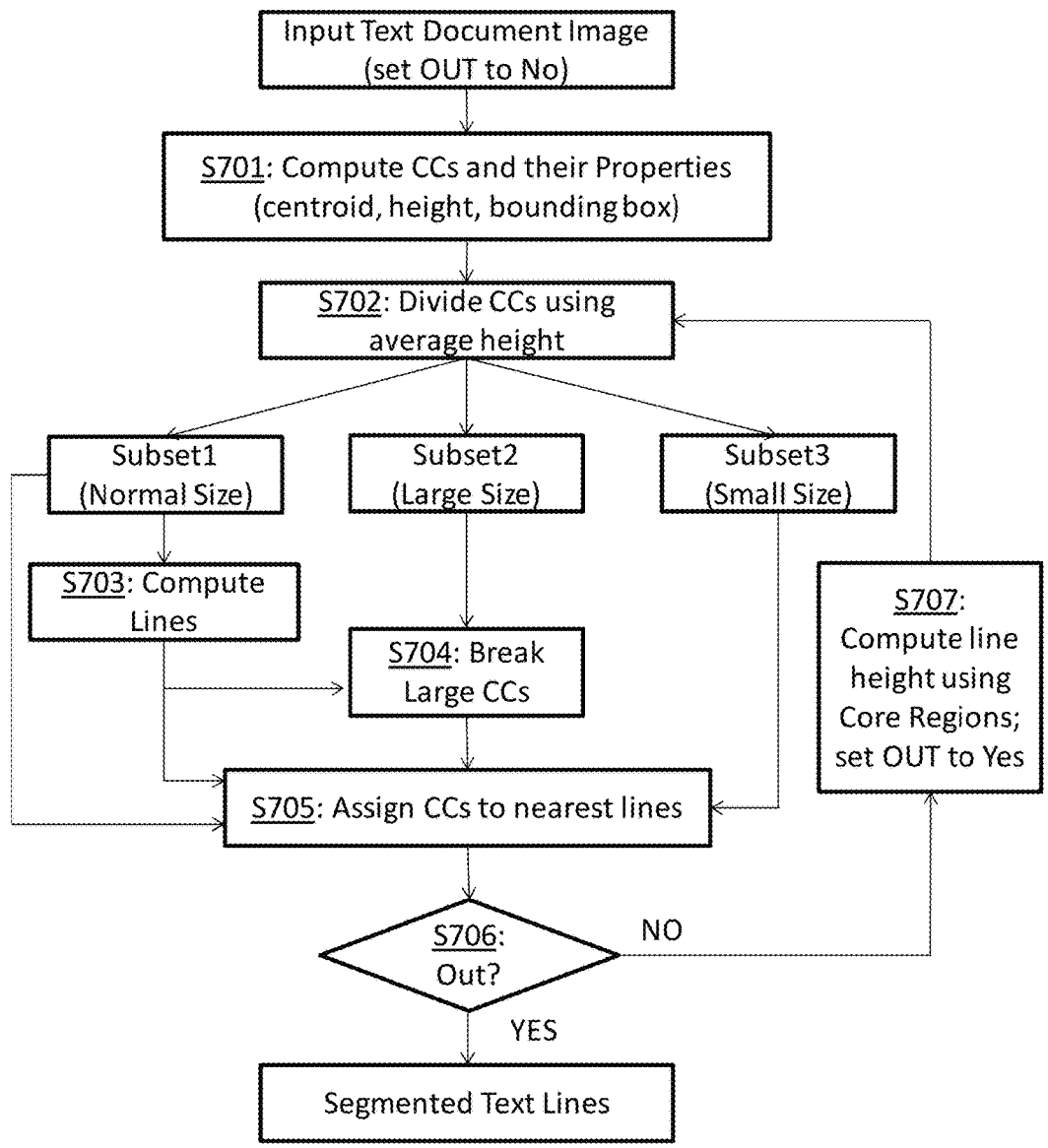
FIG. 7 schematically illustrates a text line segmentation method according to another embodiment of the present invention.

FIG. 7 is a flowchart showing a line segmentation method according to an alternative embodiment of the present invention. Similar to the method of FIG. 1, the input data is a binary text document image. In the method of FIG. 7, steps S701 to S705 are respectively similar to steps S101 to S105 of the method of FIG. 1. In the first time step S702 is executed, the average CC height calculated in step S701 is used to set the criteria for dividing the CCs into three subsets. The line detection in step S703 may be performed using the method of FIG. 2 described earlier, or by a conventional line detection method. After steps S701 to S705 are performed once, a core region height computation step (step S707) is performed, which uses the text lines outputted by step S705 to compute the average core region height. The core region height computation step S707 is performed using the method of FIG. 6 described earlier. Then, the process goes back to step S702 to divide the CCs into three subsets, but this time using the average core region height obtained in step S707 to set the criteria for the division.

The process flow of FIG. 7 is controlled by a flag "OUT". The flag is initiated to "NO" when the process begins; after step S705, if the flag is "NO" (step S706), step S707 is performed. Step S707 sets the flag to "YES" before going back to step S702. In step S702, either the average height obtained by step S701 is used when the flag is "NO" (first time), or the average height obtained by step S707 is used when the flag is "YES" (second time). The second time step S706 is executed, the flag has been set to "YES", so the process ends.

The method of FIG. 7 can achieve the same refined result as the method of FIG. 3.

Embodiments of the present invention provide a robust method for text line segmentation for ICR/IWR. This method has several benefits and advantages over the conventional method described in Louloudis 2009, including: It provides a robust method to approximate average character height using core regions which is independent of the inter-connections. It provides a more accurate way to find text lines from the connected components. The more accurate computation of height and lines lead to better recognition accuracy for ICR/IWR. In the line detection method of FIG. 2, the elimination of false lines (e.g., the elimination of lines higher than 1.2 times the average height, step S207) at an initial stage reduces the computational complexity of line segmentation as well as the ICR/IWR system. The character height can be re-used for the subsequent word/character segmentation stage. The method of FIG. 3 can be used to refine the line segmentation result generated by any other line segmentation method.

Figure 9:
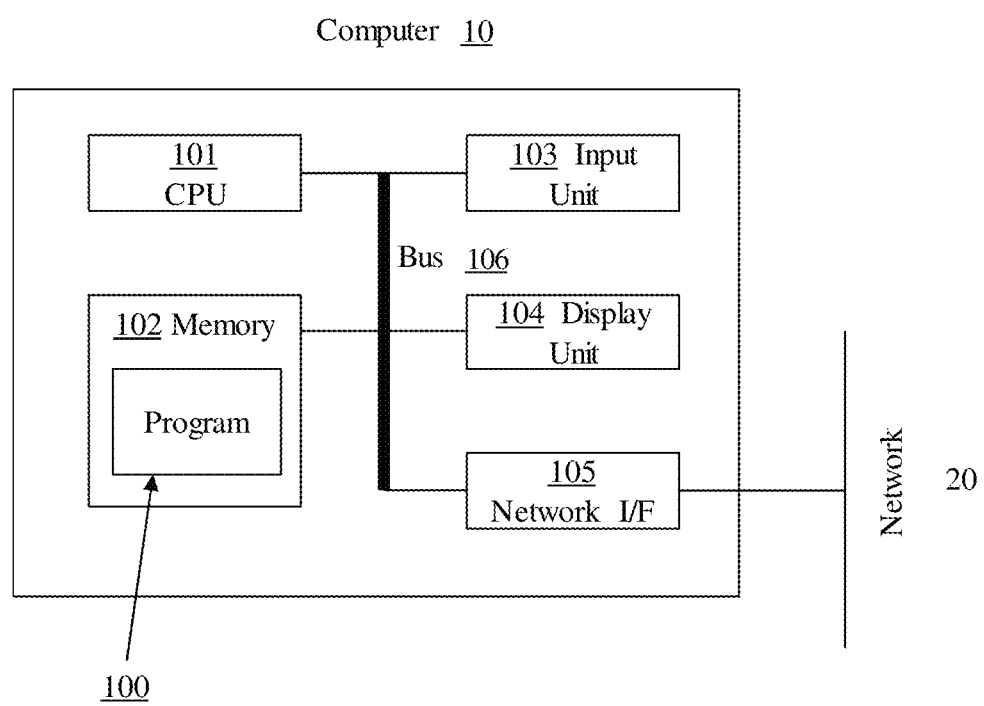
FIG. 9 schematically illustrates a computer system in which embodiments of the present invention may be implemented.

The various methods described above may be implemented in hardware, software or firmware. For example, FIG. 9 shows an exemplary computer in which embodiments of the present invention may be implemented. As shown in FIG. 9, this computer 10 comprises a Central Processing Unit (CPU) 101, a memory 102, an input unit 103 such as a keyboard, a display unit 104 such as a computer monitor, and a network interface 105, all these components (including those not shown) communicating with each other internally via a bus 106. Through the network interface 105, the computer 10 is connected to a network 20, such as a LAN or WAN, and communicate with other devices connected to the network. Usually the memory 102 stores computer-executable instructions or software programs accessible to the CPU 101, which is configured to execute software programs as needed in operation. Preferably, such software programs are designed to run on a computer operating system implementing a GUI (graphic user interface). In one embodiment, such software in the memory 102 includes a program 100, which, when executed by the CPU 101, enables the computer 10 to perform a text line segmentation method described above. In addition, the CPU 101 is also configured to execute other types of software (e.g., administrative software), applications (e.g., network communication application), operating systems, etc.

It will be apparent to those skilled in the art that various modification and variations can be made in the text line segmentation method and related apparatus of the present invention without departing from the spirit or scope of the invention. Thus, it is intended that the present invention cover modifications and variations that come within the scope of the appended claims and their equivalents.

What is claimed is:

1. A text line segmentation method performed on a binary document image, comprising:
   (a) detecting connected components in the document image, and computing centroids and bounding boxes of the connected components;
   (b) categorizing the connected components into three subsets based on their bounding box sizes, including a first subset of normal size connected components, a second subset of large size connected components, and a third subset of small size connected components;
   (c) detecting a plurality of candidate lines from the first subset of connected components by applying Hough transform to the centroids of the first subset of connected components;
   (d) removing candidate lines that has a line bounding box height greater than a predefined multiplier times an average line bounding box height of all candidate lines, wherein remaining candidate lines constitute legitimate lines;
   (e) for each connected component of the first subset, computing an overlap area between the connected component and each legitimate line, and if a maximum one among the overlap areas is no greater than a predefined fraction of a bounding box area of the connected component, adding a new line as a legitimate line, wherein the new line passes through the centroid of the connected component and has an angle equal to an average angle of all candidate lines;
   (f) breaking each of the second subset of connected components into two or more connected components; and
   (g) assigning each connected component of the first subset, each connected component of the third subset, and each connected component obtained by breaking the connected components of the second subset in step (f), to a nearest one of the legitimate lines obtained in step (e), to generate segmented text lines.

2. The method of claim 1, wherein the predefined multiplier is 1.2.

3. The method of claim 1, wherein the predefined fraction is one-third.

4. The method of claim 1, wherein step (c) includes:
   (c1) applying Hough transform to the centroids of the first subset of connected components to generate an accumulator array having a plurality of cells;
   (c2) identifying a cell of the accumulator array that has a maximum value among the cells, and if its value is greater than a predefined threshold, adding a line corresponding to the identified cell to a list of candidate lines and removing connected components belonging to the candidate line from the first subset of connected components; and
   repeating steps (c1) and (c2) until the value of the cell having a maximum value is no greater than the predefined threshold.

5. The method of claim 4, wherein in step (c1), an angle of the Hough transform is limited to a range of 85-95 degrees.

6. The method of claim 4, wherein the predefined threshold is 5.

7. The method of claim 1, wherein step (d) includes:
   for each candidate line detected in step (c), computing a line bounding box that bounds all connected components of the first subset that belong to the candidate line;
   computing an average line bounding box height of the line bounding boxes of all candidate lines;
   removing any candidate line that has a line bounding box height greater than the predefined multiplier times the average line bounding box height.

8. The method of claim 1, wherein in step (b) the connected components are categorized into three subsets based on their bounding box sizes and an average connected component height, wherein a connected component is categorized into the first subset of normal size connected components if $$s1*AH' \leq H < s2*AH' \text{ and } s3*AH' \leq W$$

where H and W are height and width of the connected component, AH is the average connected component height, AW is an average character width which equals AH, and s1, s2 and s3 are predefined threshold sizes, and a connected component is categorized into the second subset of large size connected components if $$H \geq s2*AH$$

or categorized into the third subset of small size connected components if it does not satisfy the above conditions.

9. The method of claim 8, further comprising:
   (h) using the segmented text lines generated in step (g), computing an average height of text lines;
   (i) categorizing the connected components detected in step (a) into three subsets based on their bounding box sizes and the average height of text lines computed in step (h), including a first subset of normal size connected components, a second subset of large size connected components, and a third subset of small size connected components, wherein a connected component is categorized into the first subset of normal size connected components if $$s1*AH' \leq H < s2*AH \text{ and } s3*AW' \leq W$$

where H and W are height and width of the connected component, AH' is the average height of text lines, AW' equals AH', and s1, s2 and s3 are predefined threshold sizes, and a connected component is categorized into the second subset of large size connected components if $$H \geq s2*AH'$$

or categorized into the third subset of small size connected components if it does not satisfy the above conditions; and
repeating steps (c), (d), (e), (f) and (g) using the three subsets of connected components obtained in step (i).

10. The method of claim 9, wherein step (h) includes:
for each segmented text line generated in step (g):
computing a pixel density histogram representing a pixel density for each row of the text line;
applying a k-means clustering computation with k=2 to the pixel density histogram to classify histogram elements into two classes corresponding to high and low density rows; and
computing a width of a widest high density region as height of the text line; and
computing an average of the heights of all text lines as the average height of text lines.

11. A computer program product comprising a computer usable non-transitory medium having a computer readable program code embedded therein for controlling a data processing apparatus, the computer readable program code configured to cause the data processing apparatus to execute a text line segmentation process on a binary document image, the process comprising:
(a) detecting connected components in the document image, and computing centroids and bounding boxes of the connected components;
(b) categorizing the connected components into three subsets based on their bounding box sizes, including a first subset of normal size connected components, a second subset of large size connected components, and a third subset of small size connected components;
(c) detecting a plurality of candidate lines from the first subset of connected components by applying Hough transform to the centroids of the first subset of connected components;
(d) removing candidate lines that has a line bounding box height greater than a predefined multiplier times an average line bounding box height of all candidate lines, wherein remaining candidate lines constitute legitimate lines;
(e) for each connected component of the first subset, computing an overlap area between the connected component and each legitimate line, and if a maximum one among the overlap areas is no greater than a predefined fraction of a bounding box area of the connected component, adding a new line as a legitimate line, wherein the new line passes through the centroid of the connected component and has an angle equal to an average angle of all candidate lines;
(f) breaking each of the second subset of connected components into two or more connected components; and
(g) assigning each connected component of the first subset, each connected component of the third subset, and each connected component obtained by breaking the connected components of the second subset in step (f), to a nearest one of the legitimate lines obtained in step (e), to generate segmented text lines.

12. The computer program product of claim 11, wherein the predefined multiplier is 1.2.

13. The computer program product of claim 11, wherein the predefined fraction is one-third.

14. The computer program product of claim 1, wherein step (c) includes:
(c1) applying Hough transform to the centroids of the first subset of connected components to generate an accumulator array having a plurality of cells;
(c2) identifying a cell of the accumulator array that has a maximum value among the cells, and if its value is greater than a predefined threshold, adding a line corresponding to the identified cell to a list of candidate lines and removing connected components belonging to the candidate line from the first subset of connected components; and
repeating steps (c1) and (c2) until the value of the cell having a maximum value is no greater than the predefined threshold.

15. The computer program product of claim 14, wherein in step (c1), an angle of the Hough transform is limited to a range of 85-95 degrees.

16. The computer program product of claim 14, wherein the predefined threshold is 5.

17. The computer program product of claim 11, wherein step (d) includes:
for each candidate line detected in step (c), computing a line bounding box that bounds all connected components of the first subset that belong to the candidate line;
computing an average line bounding box height of the line bounding boxes of all candidate lines;
removing any candidate line that has a line bounding box height greater than the predefined multiplier times the average line bounding box height.

18. The computer program product of claim 11, wherein in step (b) the connected components are categorized into three subsets based on their bounding box sizes and an average connected component height, wherein a connected component is categorized into the first subset of normal size connected components if $$s1*AH \leq H < s2*AH \text{ and } s3*AW \leq W$$

where H and W are height and width of the connected component, AH is the average connected component height, AW is an average character width which equals AH, and s1, s2 and s3 are predefined threshold sizes, and a connected component is categorized into the second subset of large size connected components if $$H \geq s2*AH$$

or categorized into the third subset of small size connected components if it does not satisfy the above conditions.

19. The computer program product of claim 18, wherein the process further comprises:
(h) using the segmented text lines generated in step (g), computing an average height of text lines;
(i) categorizing the connected components detected in step (a) into three subsets based on their bounding box sizes and the average height of text lines computed in step (h), including a first subset of normal size connected components, a second subset of large size connected components, and a third subset of small size connected components, wherein a connected component is categorized into the first subset of normal size connected components if $$s1*AH' \leq H < s2*AH' \text{ and } s3*AW' \leq W$$

where H and W are height and width of the connected component, AH' is the average height of text lines, AW' equals AH', and s1, s2 and s3 are predefined threshold sizes, and a connected component is categorized into the second subset of large size connected components if $$H \geq s2*AH'$$

or categorized into the third subset of small size connected components if it does not satisfy the above conditions; and repeating steps (c), (d), (e), (f) and (g) using the three subsets of connected components obtained in step (i).

20. The computer program product of claim 19, wherein step (h) includes:

for each segmented text line generated in step (g):
computing a pixel density histogram representing a pixel density for each row of the text line;
applying a k-means clustering computation with k=2 to the pixel density histogram to classify histogram elements into two classes corresponding to high and low density rows; and
computing a width of a widest high density region as height of the text line; and computing an average of the heights of all text lines as the average height of text lines.

* * * * *